June 24, 1930.  F. F. VAN TUYL  1,765,550
SYSTEM FOR THE PASTEURIZATION OF LIQUIDS
Filed Feb. 4, 1928  2 Sheets-Sheet 1
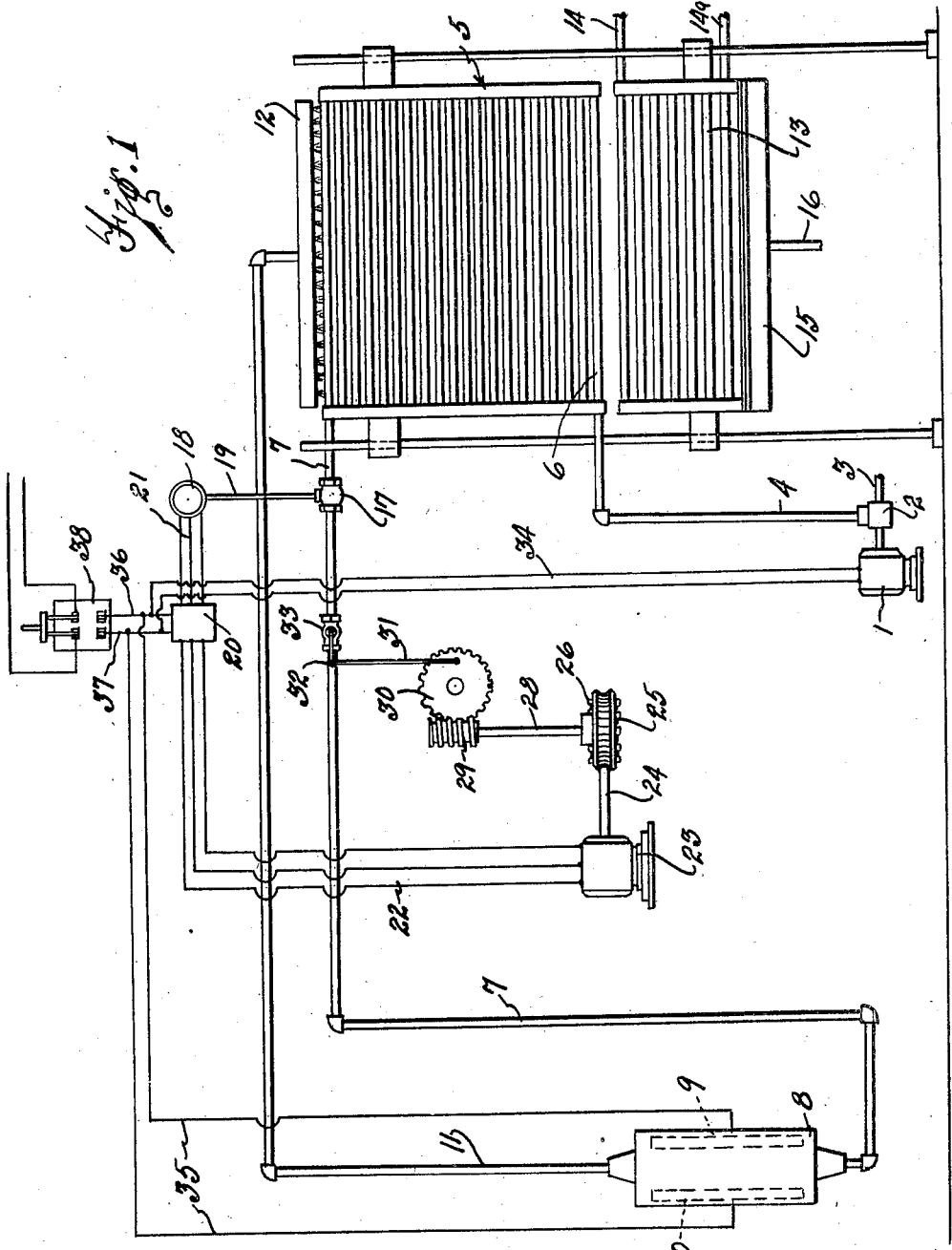
INVENTOR.
FRANK F. VAN TUYL
BY
ATTORNEY.

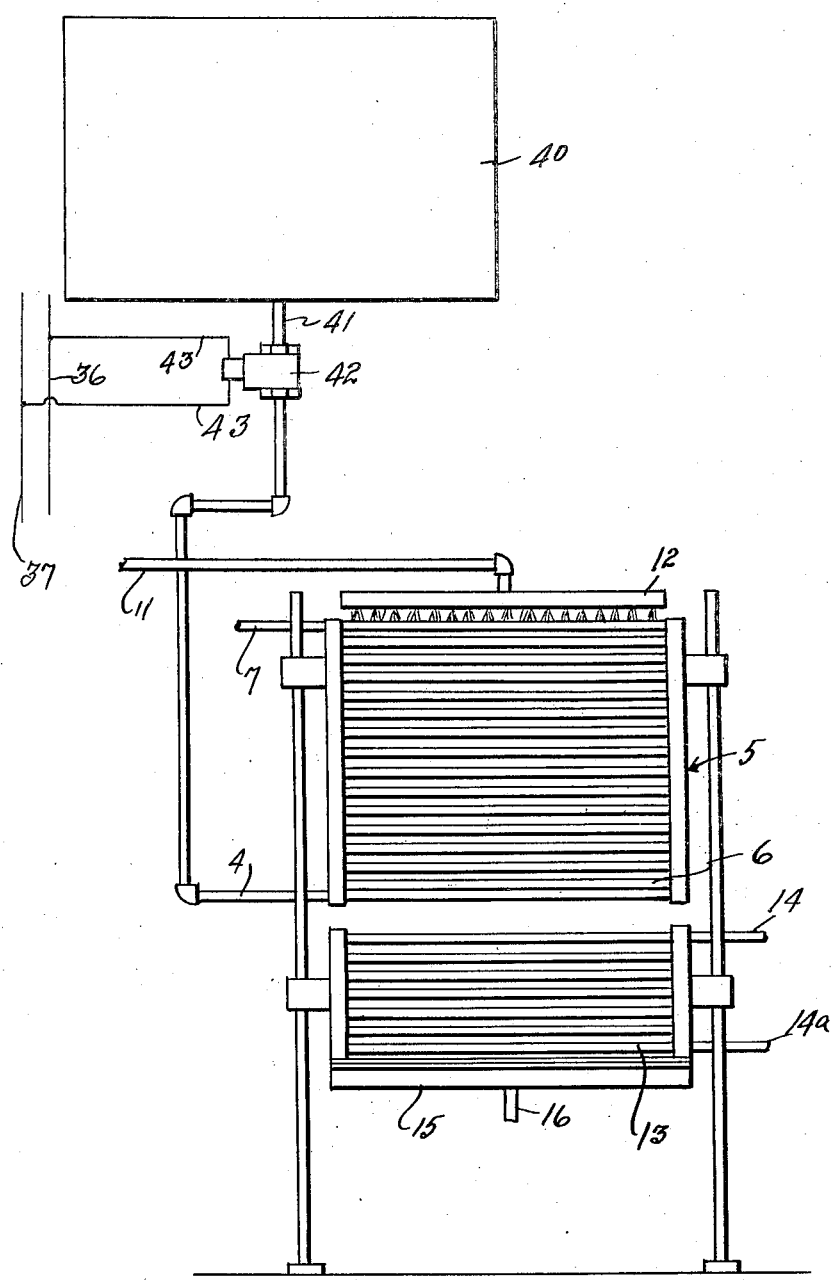

Patented June 24, 1930

1,765,550

UNITED STATES PATENT OFFICE

FRANK F. VAN TUYL, OF ANN ARBOR, MICHIGAN

SYSTEM FOR THE PASTEURIZATION OF LIQUIDS

Application filed February 4, 1928. Serial No. 252,017.

This invention relates to a system for the pasteurization of liquids more specifically of the type in which the liquid flows between electrodes and is heated to pasteurizing temperature by reason of flow of current through the liquid as it passes therebetween.

In previous systems for the purification of liquids by passing electric current therethrough, as illustrated for instance in the patent to H. B. Rudd, No. 1,333,633 of March 16, 1920, the flow of liquid through the purifier or pasteurizer is controlled by a temperature actuated discharge valve but, inasmuch as flow of liquid to the pasteurizer containing the electrodes may vary during the period of operation, the valve may not operate quickly enough to prevent passage of some quantity of liquid insufficiently heated or may tend to restrict the flow to such an extent that the liquid becomes overheated before the valve is actuated.

All previous apparatus of this type of which I have any knowledge attempt to control flow between the electrodes by the temperature of the liquid after it has passed therebetween and the object of this invention is to provide a system in which the volume of flow of liquid per unit of time through the pasteurizer and between the electrodes is controlled by the temperature of the liquid before it passes thereinto. By providing electrodes of certain area with current of practically constant value fluid of definite temperature will be raised a certain number of degrees in a specified time and by varying the rate of flow in accordance with the temperature of the liquid as it passes to the pasteurizer the temperature of the fluid flowing from the pasteurizer is practically constant.

A further object of the invention is to provide a system for the electric purification of liquids such as milk in which system is included a regenerative cooler of well known type through which the liquid supplied to the pasteurizer is passed and preheated by the liquid discharged from the pasteurizer, the system including a pump or means for supplying the liquid whereby the quantity flow to the cooler for preheating is the same as the quantity of heated fluid passing through the cooler in the same period of time and any variation in rate of flow through variation of temperature of the fluid supplied in like manner varies the rate of the flow through the discharge line from the pasteurizer to the cooler and a further feature of this invention is in providing electrically operated control elements all supplied directly from a single source of current supply so that, as is hereinafter more fully described, the failure of current supply for any cause will cause cessation of operation of the system.

These and other objects and the various novel features of the invention are hereinafter more fully described and claimed, and a system embodying my invention is shown in the accompanying drawings in which—

Fig. 1 is a diagram showing my improved system for the electric purification of milk including diagrammatic representation of various devices used therein including an electrically operated pump for supplying liquid.

Fig. 2 is a similar view showing the system as supplied by gravity from a supply tank the flow being controlled by an electrically operated valve.

The system includes several control devices well known in the art as will be understood from the following—

1 indicates an electric motor for driving a pump 2 preferably of the centrifugal type. 3 is the supply line and 4 the discharge line therefor. 5 indicates the well known type of regenerative cooler and it is to be understood that either the well known "open" type of cooler may be used in which the discharge line discharges through the interior of the tubes and the heated fluid passes over the outside thereof or the "closed" type in which fluid from the discharge line 4 passes over the outside of the tubes and between the same and through which heated fluid flows as will be readily understood by those familiar with the art. I have here illustrated what is known as the "open" type of cooler in which the fluid is discharged through the pipe 4 into the coils 6 from the cooler through the discharge line 7 to the bottom of the pasteurizer 8. This pasteurizer is of a type such as is shown in the Rudd patent above mentioned and in which there are electrodes 9 and 10 on opposite side walls between which the fluid flows from the line 7 to the discharge line 11 of the pasteurizer. A feature of the invention is to provide for a flow of liquid regulated as to volume per unit of time by its temperature as is hereinafter described so that the fluid passing to the line 11 is always at approximately pasteurizing temperature. This fluid passes from line 11 to the head 12 of the regenerative cooler through which it is discharged through a series of fine apertures over the exterior of the tubes 6. It is to be noted that in the cooler here shown the line 4 passes to the cooler above the bottom thereof and that the bottom coils 13 of the cooler are refrigerator coils supplied with refrigerant by the lines 14 and 14ª leading from and to refrigerating apparatus (not here shown) so that after the heated liquid from the head 12 has passed over the coils 6 and lost the principal portion of its heat to the fluid flowing thereinto through the line 4 is finally cooled by the refrigerator coils 13 and flows into the trough 15 and passes by the line 16 to any desired receptacle.

In the discharge line 7 of the regenerative cooler is provided a fitting 17 in which a bulb of the thermometer 18 is positioned. The bulb in the fitting 17 is connected with the thermometer by the usual armored capillary tube 19. A thermometer of any approved type may be utilized. A convenient type for this purpose is shown on pages 26 and 29 in catalog No. 87 of The Brown Instrument Company of Philadelphia, Pennsylvania. These thermometers include a pointer and an index arm on each side that may be set at any temperature along the scale and as soon as the pointer makes contact with one of these arms (not here shown) an electric connection is made through the relay 20, a convenient type of which is illustrated in the said catalog on page 32. The thermometer 18 is electrically connected by line 21 with the relay and the relay by circuit wires 22 is connected with an electric motor 23, the illustration showing a three-wire circuit between the thermostat, relay, and motor so that current may be supplied to turn the motor in one direction through the closing of one of the contacts of the thermometer and in the other direction by the closing of the other contact. The motor shaft 24 has a worm 25 thereon meshing with a worm gear 26 having a shaft 28. This shaft 28 has a worm 29 meshing with the worm gear 30 and pivotally connected with the worm gear 30 is a link 31 attached to the arm 32 of a control valve 33 positioned in the discharge line 7 leading to the pasteurizer. The electric motor 1 is supplied by the circuit 34 and the pasteurizer by the circuit 35 both of which are independently connected with the main lines 36 and 37 from the main switch 38 connected with the source of current supply. The relay 20 is also directly supplied by the lines 36 and 37. Thus, all the control apparatus is independently supplied from the lines 36 and 37 and the opening of the switch 38 or failure of current causes cessation of operation of all parts of the system. It is to be noted that the valve 33 is set in position by the motor 23 controlled by the thermometer 18 that is to say, the thermometer, if too cold a liquid is flowing, acts through the relay to operate the motor to partially close the valve and lessen the rate of flow through the discharge line 7 and if the temperature of the liquid in the discharge line be increased the thermometer will operate to cause the motor 23 to increase the valve opening and increase the rate of flow of liquid to and from the pasteurizer. Another convenient type of motor operated valve mechanism is described on pages 34 and 35 of Catalog No. 87 of The Brown Instrument Company.

The operation of the system therefore will be understood as follows—

Liquid is supplied to the regenerative cooler either through the electrically controlled rotary pump or from the tank 40 which, as shown in Fig. 2, is connected with the cooler by a line 41 in which is a suitable electrically controlled valve 42 having a circuit 43 connected with the supply circuit 36 and 37. This valve is held open by a flow of current and in the case of failure of current supply automatically closes preventing flow of liquid to the cooler. Thus, whether the system utilizes an electrically operated pump or electrically controlled flow from a tank the operation of the system is identical.

The principal use of the system is probably for pasteurization of milk and this milk comes from receiving tanks to the pump 2 and to the line 4 or 41 at a temperature varying from between about 35 degrees F., and 60 degrees F., and the milk in passing through the coils 6 is heated by milk that has already passed the pasteurizer and discharged through the head 12. If this milk passing through the line 6 be of a comparatively high temperature it may pass more rapidly through the pasteurizer 8 and if it be of a lower temperature is required to pass more slowly through the pasteurizer 8 in order that it may be heated to pasteurizing temperature in the time period of its flow between the electrodes.

The bulb in the fitting 17 and thermometer 18 therefore through its sensitiveness to temperature change either causes the motor 23 to operate to increase or to decrease the opening of the valve 33 and the volume of flow per unit of time through the pasteurizer is therefore fixed according to the temperature of the liquid before it reaches the pasteurizer and electrodes. The current flow to the electrodes being of practically constant value, my system of control of volume of flow per unit of time insures a practically constant temperature of liquid discharged from the pasteurizer. As heretofore stated, the heated milk tends to raise the temperature of the cold milk discharging to the cooler through the line 4 and, after the milk first passes through the cycle, the heating and cooling is continuous and uniform as long as the quantity of milk passing to the cooler from the pump or tank and heated milk passing thereto through the line 11 from the pasteurizer is maintained at constant rate of flow. While the rate of flow may vary it varies simultaneously in both the lines 4 and 11.

While I have described and shown a pasteurizer of the type wherein the liquid is heated by passage of electric current therethrough, it is to be understood that my invention is not confined to the particular type of pasteurizer inasmuch as pasteurizers having other means of supplying heat at a substantially constant rate will operate equally as well in the system disclosed and the appended claims not specifically involving the electric type of pasteurizer are to be understood as referring to any type of pasteurizer in which heat is supplied at substantially constant rate.

It is also to be understood that means other than the valve 33 may be utilized to vary the volume of flow per unit of time in the line 7. The valve shown is only one convenient means for controlling the rate of flow but my invention contemplates the utilization of any means adapted to vary the rate of flow to correspond with variation in temperature of the liquid supplied to the conduit 7.

Having thus fully described my invention, what I claim and desire to secure by Letters Patent of the United States is—

1. In apparatus for pasteurization of liquids, a regenerative cooler to which liquid is supplied, electrically controlled means for supplying liquid continuously thereto throughout an indeterminate period in which liquid of differing temperatures may be supplied and whereby the liquid discharging from the cooler, while increased in temperature, tends to correspondingly vary during the period of operation, a pasteurizer through which the liquid passes freely, means for supplying heat at practically constant rate to the pasteurizer whereby the liquid passing therethrough becomes heated, and means controlling the volume of flow per unit of time to the pasteurizer to cause variation in the rate of flow to the pasteurizer by reason of variation in temperature of the liquid whereby the temperature of the liquid discharging from the pasteurizer is practically constant.

2. In apparatus for the pasteurization of liquids, a regenerative cooler to which liquid is supplied continuously throughout an indeterminate period during which the temperature of liquid supplied may vary, a discharge line for the cooler, a pasteurizer in the discharge line of a type in which electric current is passed through the liquid to heat the same, means in the discharge line between the pasteurizer and the cooler for varying the volume of flow per unit of time, temperature controlled means for actuating said varying means substantially in accordance with variation in temperature of the liquid passing from the cooler, a conduit leading from the pasteurizer and discharging to the cooler wherein the heated fluid discharging from the pasteurizer tends to increase the temperature of the fluid passing thereto, the pasteurizer and the discharge conduit therefor providing for a free flow of fluid through the pasteurizer to the full capacity in volume per unit of time of the discharge line of the cooler leading to the pasteurizer.

3. In apparatus for the pasteurization of milk and the like, a pasteurizing device, a conduit through which milk is supplied to the pasteurizer, a conduit through which it is discharged from the pasteurizer, said discharge conduit providing for an unrestricted flow therethrough up to the capacity of the supply conduit, the arrangement of the conduits being such that the inflowing milk is subjected to the heat of the milk discharged from the pasteurizer, said pasteurizer being of a character to supply heat to fluid passing therethrough at a substantially constant rate, and means for controlling the volume of flow per unit of time to the pasteurizer consisting of a valve, and means influenced by temperature of the fluid passing to the pasteurizer to actuate the valve and vary the rate of flow thereto in accordance with the temperature.

4. In apparatus of the character described, a pasteurizer of a type providing for supply of heat at substantially constant rate, means for supplying liquid to the pasteurizer, means for varying the volume of flow per unit of time to the pasteurizer, temperature responsive apparatus for controlling said means whereby the rate of flow is varied in accordance with variation in temperature of the liquid supplied to the pasteurizer, and a discharge line providing for unrestricted discharge of liquid from the pasteurizer as rapidly as it may be supplied thereto.

5. In apparatus for the pasteurization of liquids, a pasteurizer, a supply conduit leading thereto, a discharge conduit therefor providing for unrestricted flow of fluid from the pasteurizer, said pasteurizer being of a character to supply heat at substantially constant rate per unit of time whereby liquid in passing therethrough is heated, means for discharging liquid through the conduits and pasteurizer continuously throughout an indeterminate period during which the temperature thereof may vary, means for varying the rate of flow through the supply conduit, a temperature responsive device arranged to actuate the said varying means in accordance with the temperature of the fluid passing through the said supply conduit.

6. In apparatus for pasteurization of liquids including a regenerative cooler to which the liquid is supplied at varying temperatures and from which the liquid may flow with similar variation in degree of temperature, a pasteurizing device to which the liquid is discharged from the cooler and from which it may pass without variation in volume of flow per unit of time, said pasteurizing device including a means for heating fluid in passing therethrough, and means for controlling the volume of flow per unit of time to the pasteurizing device adapted to vary the rate of flow thereto in correspondence with variation in temperature of the liquid discharged from the cooler.

7. In apparatus for the pasteurization of liquids, a regenerative cooler to which liquid having various degrees of temperature is supplied and from which it is discharged, a pasteurizer containing electrodes between which the liquid from the cooler flows, a discharge conduit for the pasteurizer providing for unrestricted flow of liquid therefrom in volume equal to the quantity possible to be supplied from the cooler, means for causing current of practically constant value to pass through the liquid between the electrodes, and means for varying the rate of flow of liquid from the cooler to the pasteurizer through variation in temperature of the liquid passing from the cooler.

In testimony whereof I sign this specification.

FRANK F. VAN TUYL.